(12) United States Patent
Choi (10) Patent No.: US 9,896,118 B2
(45) Date of Patent: Feb. 20, 2018

(54) CONNECTING AND STABILIZING MECHANISM OF FOLDABLE CART AND FOLDABLE CART HAVING SAME

(71) Applicant: Campvalley (Xiamen) Co. Ltd., Xiamen (CN)

(72) Inventor: Kwan Jun Choi, Xiamen (CN)

(73) Assignee: Campvalley (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 15/453,793

(22) Filed: Mar. 8, 2017

(65) Prior Publication Data
US 2017/0259838 A1 Sep. 14, 2017

(30) Foreign Application Priority Data
Mar. 8, 2016 (CN) .................... 2016 2 0173262 U (51) Int. Cl.
*B62B 3/02* (2006.01)
*B62B 5/06* (2006.01)

(52) U.S. Cl.
CPC ............. *B62B 3/025* (2013.01); *B62B 5/064* (2013.01); *B62B 2205/26* (2013.01)

(58) Field of Classification Search
CPC ........... B62B 3/02–3/027; B62B 5/064; B62B 2205/26; B65D 7/24; B65D 7/26; B65D 7/28
See application file for complete search history.

(56) References Cited

U.S. PATENT DOCUMENTS

| | | | | |
|---|---|---|---|---|
| 1,919,103 A * | 7/1933 | Dolge | ....................... | B62B 3/02 |
| | | | | 280/640 |
| 1,998,269 A * | 4/1935 | Brown | .................... | A61G 21/00 |
| | | | | 27/27 |
| 9,145,154 B1 * | 9/2015 | Horowitz | ................ | B62B 3/025 |
| 9,738,298 B1 * | 8/2017 | Yang | ....................... | B62B 3/025 |
| 2010/0156069 A1 * | 6/2010 | Chen | ....................... | B62B 3/007 |
| | | | | 280/639 |
| 2014/0353945 A1 * | 12/2014 | Young | ....................... | B62B 3/02 |
| | | | | 280/650 |
| 2015/0035258 A1 * | 2/2015 | Chen | ........................ | B62B 3/02 |
| | | | | 280/651 |
| 2016/0347338 A1 * | 12/2016 | Vargas, II | ................. | B62B 3/02 |
| 2017/0015340 A1 * | 1/2017 | Fitzwater | ................ | B62B 3/022 |
| 2017/0021850 A1 * | 1/2017 | Bowman | ................. | B62B 3/007 |
| 2017/0066463 A1 * | 3/2017 | Wang | ....................... | B62B 3/022 |

\* cited by examiner

*Primary Examiner* — Erez Gurari
(74) *Attorney, Agent, or Firm* — Morgan, Lewis & Bockius LLP (57) ABSTRACT

Disclosed are foldable carts, and connecting and stabilizing mechanisms of foldable carts. A foldable cart includes first and second frames pivotally connected to each other by a connecting and stabilizing mechanism. The connecting and stabilizing mechanism allows the first and second frames to rotate toward or away from each other, and thus allow the cart to fold and unfold. The connecting and stabilizing mechanism includes positioning pins and corresponding slots to receive the positioning pins, and thus prevent the cart from folding unintentionally.

22 Claims, 6 Drawing Sheets

CONNECTING AND STABILIZING MECHANISM OF FOLDABLE CART AND FOLDABLE CART HAVING SAME

CROSS-REFERENCE TO RELATED APPLICATIONS

The present application claims priority to Chinese Utility Model Application CN 201620173262.2 filed Mar. 8, 2016. The disclosure of the application is incorporated herein for all purposes by reference in its entirety.

FIELD OF THE INVENTION

The present invention generally relates to foldable carts, and more particularly, relates to connecting and stabilizing mechanisms of foldable carts and foldable carts having such mechanisms.

BACKGROUND

Foldable carts are widely used for transporting groceries, packages, luggage or the like. They are also used in industries for transporting processed goods, finished products, and the like. However, many existing foldable carts are not configured to facilitate easy folding and unfolding of the carts, nor configured with a means to stabilize the carts once the carts are unfolded and in use. An example of such carts is disclosed in CN 01811289.7, the disclosure of which is incorporated herein for all purposes by reference in its entirety. On one hand, folding of such a cart is not easy as a user has to push the sides of the cart very hard toward the center of the cart. On the other hand, such a cart cannot carry a heavy load; otherwise it may be folded unintentionally. In addition, in some cases, existing foldable carts are not designed to minimize the folded sizes of the carts. As a result, such existing foldable carts require a relatively large space for storage and inconvenient to carry around.

Given the current state of the art, there remains a need for foldable carts and stabilizing mechanisms that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides stabilizing mechanisms and foldable carts that are stable and easy to use.

In various exemplary embodiments, the present invention provides a foldable cart including a cart frame and a plurality of wheels rotatably coupled to the cart frame. The cart frame includes a first frame and a second frame. Each of the first and second frames includes a first upper longitudinal bar and a first lower longitudinal bar on a first side, and a second upper longitudinal bar and a second lower longitudinal bar on a second side. The cart frame also includes a connecting and stabilizing mechanism disposed between the first and second frames and pivotally connecting the first and second frames.

In various exemplary embodiments, the present invention provides a connecting and stabilizing mechanism including a first connector and a second connector disposed between the first and second frames at the first and second sides, respectively. Each of the first and second connectors includes an upper connecting piece, a lower connecting piece, a middle connecting bar, a first pivoting piece and a second pivoting piece. The upper connecting piece has a first end portion pivotally connected to the first or second upper longitudinal bar of the first frame and a second end portion pivotally connected to the first or second upper longitudinal bar of the second frame. The lower connecting piece has a first end portion and a second end portion. The middle connecting bar is disposed between the upper connecting piece and the lower connecting piece, and has an upper end portion fixedly coupled to the upper connecting piece and a lower end portion fixedly coupled to the lower connecting piece. The first pivoting piece is pivotally connected to the first end portion of the lower connecting piece, and fixedly connected to the first or second lower longitudinal bar of the first frame. The second pivoting piece is pivotally connected to the second end portion of the lower connecting piece, and fixedly connected to the first or second lower longitudinal bar of the second frame. At least one connector in the first and second connectors further includes a first positioning pin and a second positioning pin. The first positioning pin is disposed at or adjacent to the first end portion of the lower connecting piece of the at least one connector, and the second positioning pin disposed at or adjacent to the second end portion of the lower connecting piece of the at least one connector. The first pivoting piece of the at least one connector is formed with a first slot corresponding to the first positioning pin. When the first positioning pin is received in the first slot, the first positioning pin restricts the first pivoting piece of the at least one connector from rotating with respect to the lower connecting piece of the at least one connector. The second pivoting piece of the at least one connector is formed with a second slot corresponding to the second positioning pin. When the second positioning pin is received in the second slot, the second positioning pin restricts the second pivoting piece of the at least one connector from rotating with respect to the lower connecting piece of the at least one connector.

In some exemplary embodiments, for each of the first and second connectors, the upper connecting piece is longer than the lower connecting piece. In an exemplary embodiment, one or more of the first and second slots are of a "C" shape.

In some exemplary embodiments, the at least one connector further include a lower block disposed in the lower connecting piece of the at least one connector. The lower block has a first side portion exposed outside of the first end portion of the lower connecting piece of the at least one connector, and a second side portion exposed outside of the second end portion of the lower connecting piece of the at least one connector. The first positioning pin is fixedly coupled to or integrally formed at the first side portion of the lower block. The second positioning pin is fixedly coupled to or integrally formed at the second side portion of the lower block.

In some exemplary embodiments, the lower block is formed with a receiving space, and the at least one connector further includes an elastic member disposed in the receiving space of the lower block. The elastic member has a lower end abutting the lower block and an upper end abutting an interior wall of the lower connecting piece of the at least one connector, thereby pushing the first positioning pin into the first slot of the first pivoting piece of the at least one connector and the second positioning pin into the second slot of the second pivoting piece of the at least one connector. In an exemplary embodiment, the elastic member is a spring.

In some exemplary embodiments, the at least one connector further includes a middle positioning rod and a handle. The middle positioning rod has a lower end portion passing through a hole formed at the lower connecting piece and coupled to the lower block, and has an upper end portion passing through a hole formed at the upper connecting piece. The handle includes a connecting portion pivotally connected to the upper end portion of the middle positioning rod at an off-center position of the connecting portion of the handle. When the handle is being positioned at a first position, the handle assists in positioning the first and second positioning pins in the first slot of the first pivoting piece and the second slot of the second pivoting piece, thereby restricting the first pivoting piece and the second pivoting piece from rotating with respect to the lower connecting piece of the at least one connector. When the handle is being positioned at a second position, the handle assists in removing the first and second positioning pins from the first slot of the first pivoting piece and the second slot of the second pivoting piece, thereby allowing the first pivoting piece and the second pivoting piece to rotate with respect to the lower connecting piece of the at least one connector.

In an exemplary embodiment, the middle positioning rod of the at least one connector is formed with a stopper at the lower end portion, and the lower block is sleeved on the lower end portion and abuts the stopper of the middle positioning rod of the at least one connector. In an exemplary embodiment, the middle connecting bar of the at least one connector is hollow to accommodate the middle positioning bar of the at least one connector.

In some exemplary embodiments, the connecting and stabilizing mechanism further includes a lateral bar disposed between the first and second connectors, and having a first end portion connected to the first connector and a second end portion connected to the second connector. In an exemplary embodiment, the first end portion of the lateral bar is connected to the lower connecting piece or the middle connecting bar of the first connector, and the second end portion of the lateral bar is connected to the lower connecting piece or the middle connecting bar of the second connector.

The connecting and stabilizing mechanisms and foldable carts of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only.

Embodiments of the present invention are described in the context of connecting and stabilizing mechanisms of foldable carts and foldable carts having such mechanisms. As used herein, the term "cart" refers to a vehicle for transportation of goods. Examples of such a cart include but are not limited to shopping carts, travel carts, transportation carts, golf carts, trolleys, and carriages. A cart can include two, three, four or more wheels. It can be pulled or pushed by a person or other means such as an engine or the like.

In general, a foldable cart of the present invention includes first and second frames pivotally connected to each other by a connecting and stabilizing mechanism. The connecting and stabilizing mechanism is configured to allow the first and second frames to rotate toward or away from each other, thereby producing the cart in folded and unfolded states. The connecting and stabilizing mechanism is also configured to stabilize the cart once it is unfolded and in use, and thus prevent the cart from folding unintentionally.

Referring now to FIGS. 1-4, there is depicted an exemplary foldable cart in accordance with some exemplary embodiments of the present invention. As show, foldable cart 100 includes a cart frame such as cart frame 10 and a plurality of wheels such as wheel 20 rotatably coupled to the cart frame. The plurality of wheels can be two, three, four or more.

Cart frame 10 includes a first frame, a second frame and a mechanism such as connecting and stabilizing mechanism 2 disposed between the first and second frames. The first and second frames can be either the same as or different from each other in terms of their configurations (e.g., sizes, shapes, the number of bars, materials of the bars). By way of example, FIGS. 1-4 illustrate substantially the same first and second frames, denoted by reference numeral 1 in the figures. The first and second frames are pivotally connected to each other by connecting and stabilizing mechanism 2. In an exemplary embodiment, foldable cart 100 includes four wheels with two wheels coupled to each of the first and second frames.

In various exemplary embodiments, each of the first and second frames 1 includes first upper longitudinal bar 111-1 and first lower longitudinal bar 112-1 on a first side, and second upper longitudinal bar 111-2 and second lower longitudinal bar 112-2 on a second side. In such embodiments, connecting and stabilizing mechanism 2 includes first connector 21-1 disposed between the first and second frames at the first side, and second connector 21-2 disposed between the first and second frames at the first and second sides, respectively.

Each of first connector 21-1 and second connector 21-2 includes an upper connecting piece such as upper connecting piece 211, a lower connecting piece such as lower connecting piece 212, and a middle connecting bar such as middle connecting bar 213. The middle connecting bar is disposed between the upper connecting piece and the lower connecting piece, and has an upper end portion coupled to or fixedly coupled to the upper connecting piece and a lower end portion coupled to or fixedly coupled to the lower connecting piece. The upper connecting piece has a first end portion pivotally connected to the first or second upper longitudinal bar of the first frame and a second end portion pivotally connected to the first or second upper longitudinal bar of the second frame. The lower connecting piece has a first end portion and a second end portion. In some exemplary embodiments, of each of the first and second connectors, the upper connecting piece is longer than the lower connecting piece.

Each of first connector 21-1 and second connector 21-2 also includes first and second pivoting pieces such as pivoting piece 3. The first pivoting piece is pivotally connected to the first end portion of the lower connecting piece, and fixedly connected to the first or second lower longitudinal bar of the first frame. The second pivoting piece is pivotally connected to the second end portion of the lower connecting piece, and fixedly connected to the first or second lower longitudinal bar of the second frame.

In some exemplary embodiments, first connector 21-1 further includes first and second positioning pins such as positioning pins 4. The first positioning pin is disposed at or adjacent to the first end portion of the lower connecting piece of the first connector. The second positioning pin disposed at or adjacent to the second end portion of the lower connecting piece of the first connector. Corresponding to the first positioning pin, the first pivoting piece of the first connector is formed with first slot 31. Corresponding to the second positioning pin, the second pivoting piece of the first connector is formed with second slot 31. In an exemplary embodiment, one or more of the first and second slots are of a "C" shape. When the first positioning pin is received in the first slot, the first positioning pin restricts the first pivoting piece of the first connector from rotating with respect to the lower connecting piece of the first connector. When the second positioning pin is received in the second slot, the second positioning pin restricts the second pivoting piece of the first connector from rotating with respect to the lower connecting piece of the first connector. As a result, the foldable cart is stable in the unfolded state.

Figure 5:
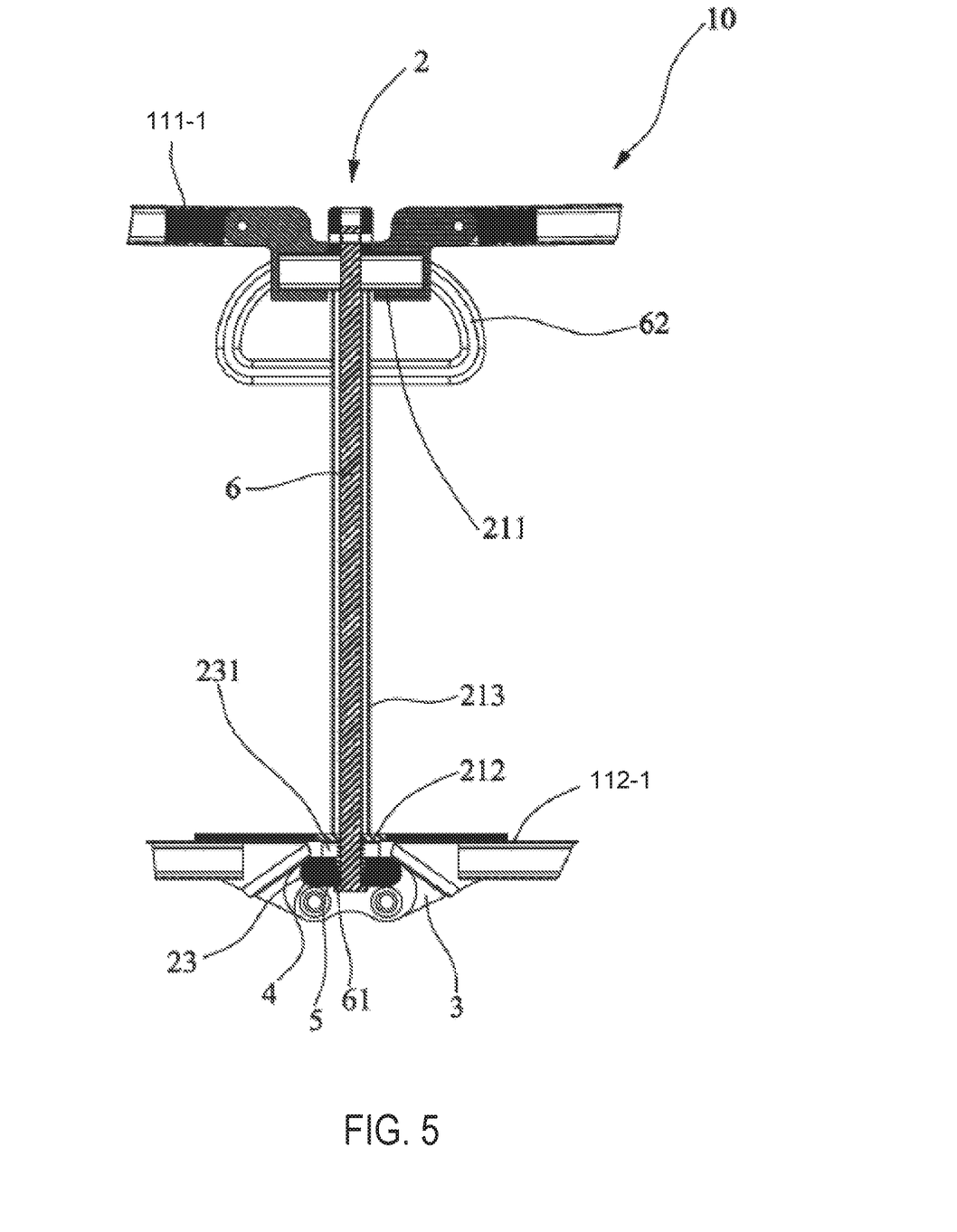
FIG. 5 is a schematic view illustrating a connector of the exemplary foldable cart of FIG. 1.
Figure 6:
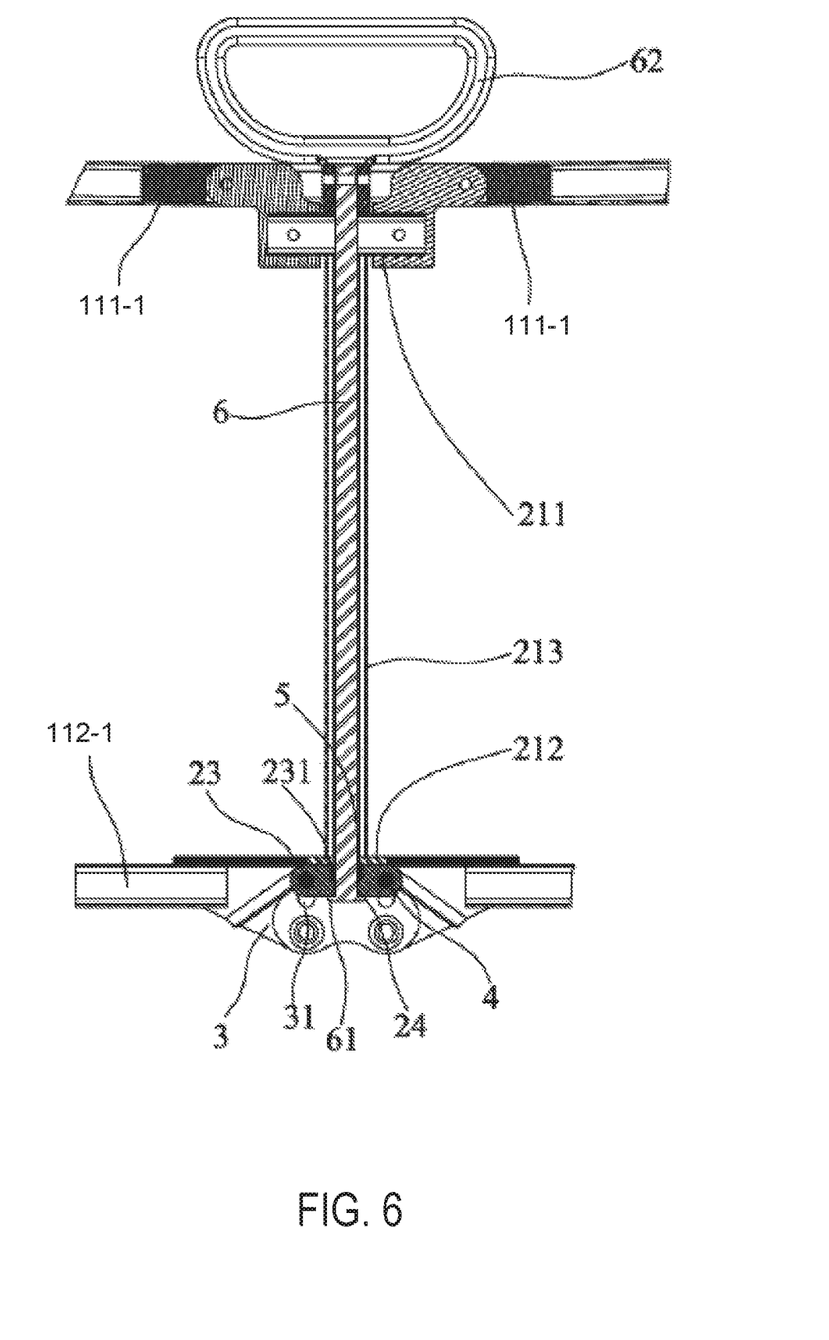
FIG. 6 is a schematic view illustrating a connector of the exemplary foldable cart of FIG. 2.

Referring to FIGS. 5 and 6, in some exemplary embodiments, first connector 21-1 further includes a lower block such as lower block 23 disposed in the lower connecting piece 212 of the first connector. The lower block has a first side portion exposed outside of the first end portion of the lower connecting piece of the first connector, and a second side portion exposed outside of the second end portion of the lower connecting piece of the first connector. In such embodiments, the first positioning pin is fixedly coupled to or integrally formed at the first side portion of the lower block, and the second positioning pin is fixedly coupled to or integrally formed at the second side portion of the lower block.

In some exemplary embodiments, first connector 21-1 further includes an elastic member such as elastic member 5. Elastic member 5 can be a spring or the like. In some exemplary embodiments, lower block 23 is formed with a receiving space such as receiving space 231 to accommodate the elastic member. The elastic member has a lower end abutting the lower block and an upper end abutting an interior wall of the lower connecting piece of the first connector. When the foldable cart is unfolded, the elastic member pushes the first positioning pin into the first slot of the first pivoting piece and the second positioning pin into the second slot of the second pivoting piece, and helps to retain the positioning pins in the corresponding slots. As a result, the first and second pivoting pieces of the first connector are restricted from rotating with respect to the lower connecting piece of the first connector. Consequently, the first lower longitudinal bars of the first and second frames are restricted from rotating with respect to each other, thereby preventing the cart from folding unintentionally.

In some exemplary embodiments, first connector 21-1 further includes a middle positioning rod such as middle positioning rod 6 and a handle such as handle 62. In an exemplary embodiment, middle connecting bar 213 of the first connector is hollow to accommodate the middle positioning bar of the first connector.

Middle positioning rod 6 has a lower end portion passing through a hole formed at lower connecting piece 212 and coupled to lower block 23 of the first connector. In an exemplary embodiment, the middle positioning rod of the first connector is formed with a stopper such as stopper 61 at the lower end portion, and the lower block is sleeved on the lower end portion and abuts the stopper of the middle positioning rod of the first connector.

Middle positioning rod 6 also has an upper end portion passing through a hole formed at upper connecting piece 211. Handle 62 has a connecting portion pivotally connected to the upper end portion of the middle positioning piece at an off-center position of the connecting portion of handle 62 (i.e., the pivot point does not coincide with the center of the connecting portion of the handle). Because of the off-center pivotal connection, positioning of handle 62 at different positions can selectively lift up or lower down middle positioning rod 6, and accordingly selectively lift up or lower down lower block 23 and positioning pins 4.

Figure 1:
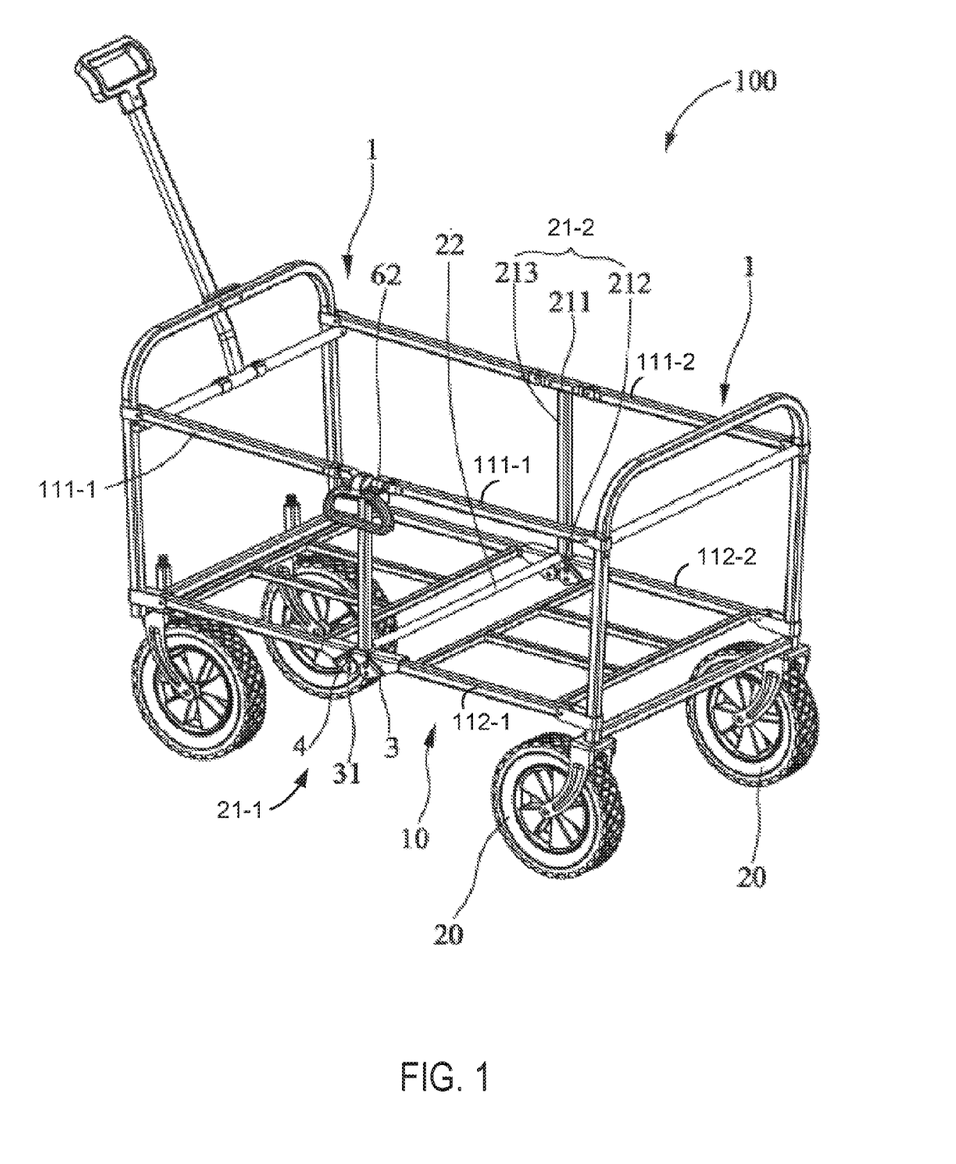
FIG. 1 is a schematic view illustrating an exemplary foldable cart in an unfolded state in accordance with some exemplary embodiments of the present invention.
Figure 2:
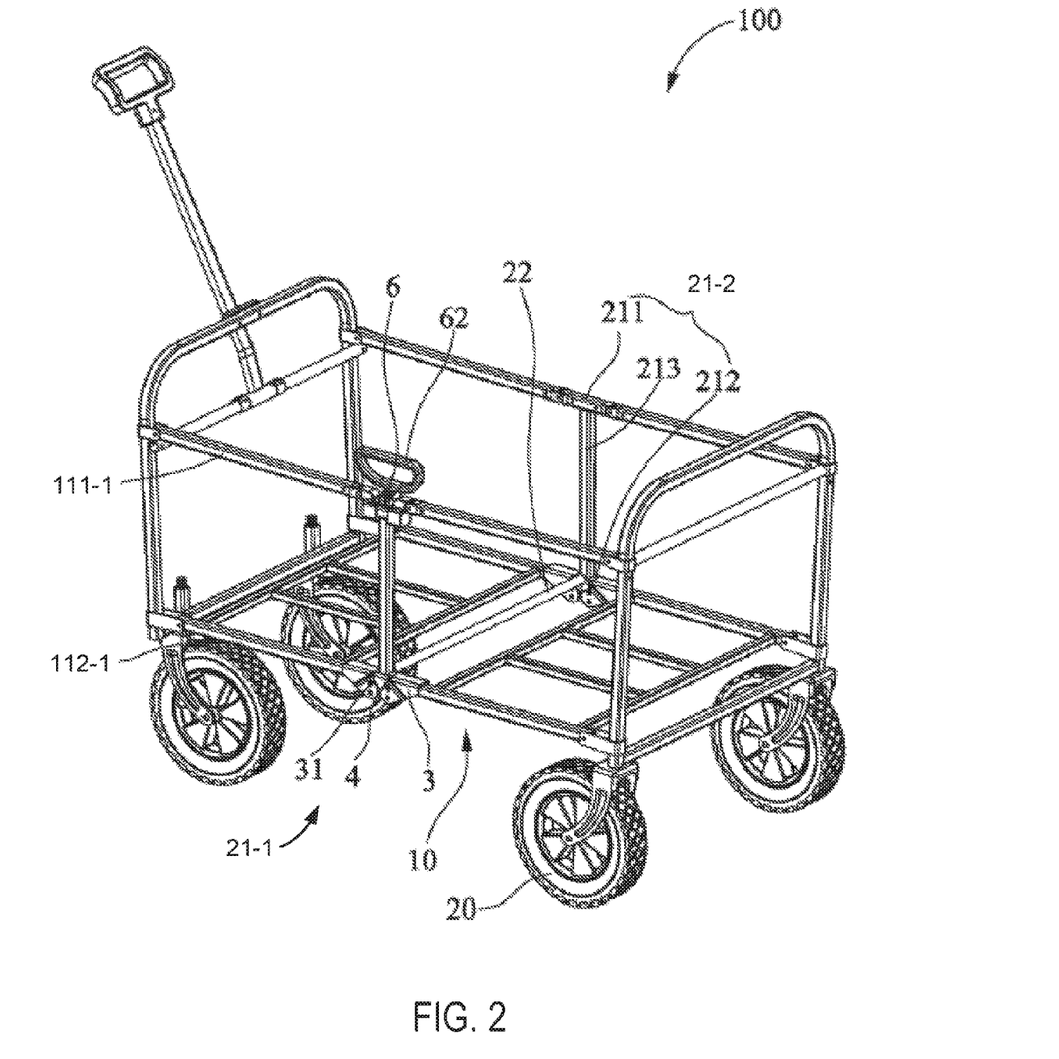
FIG. 2 is a schematic view illustrating the exemplary foldable cart of FIG. 1 in a first partially folded state.
Figure 3:
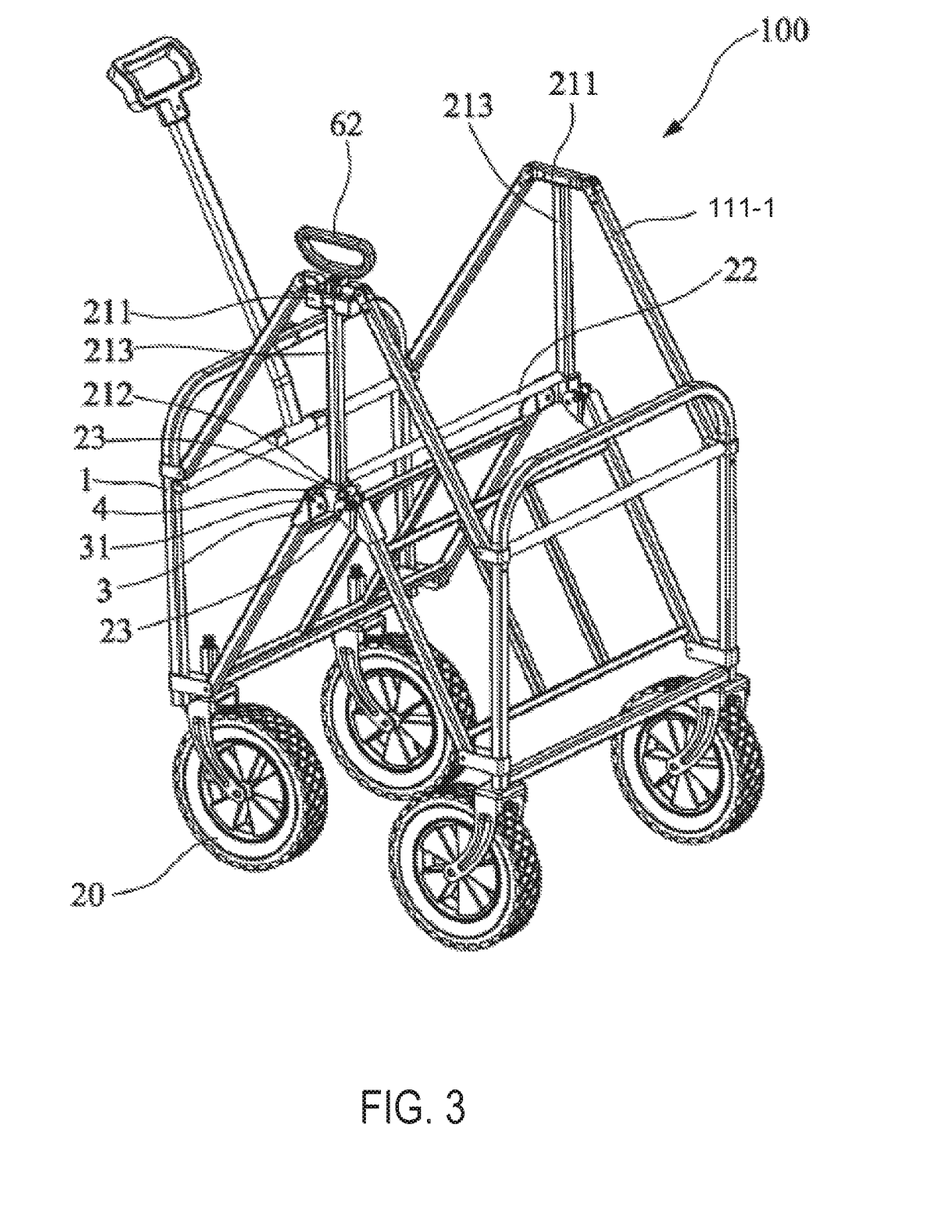
FIG. 3 is a schematic view illustrating the exemplary foldable cart of FIG. 1 in a second partially folded state.
Figure 4:
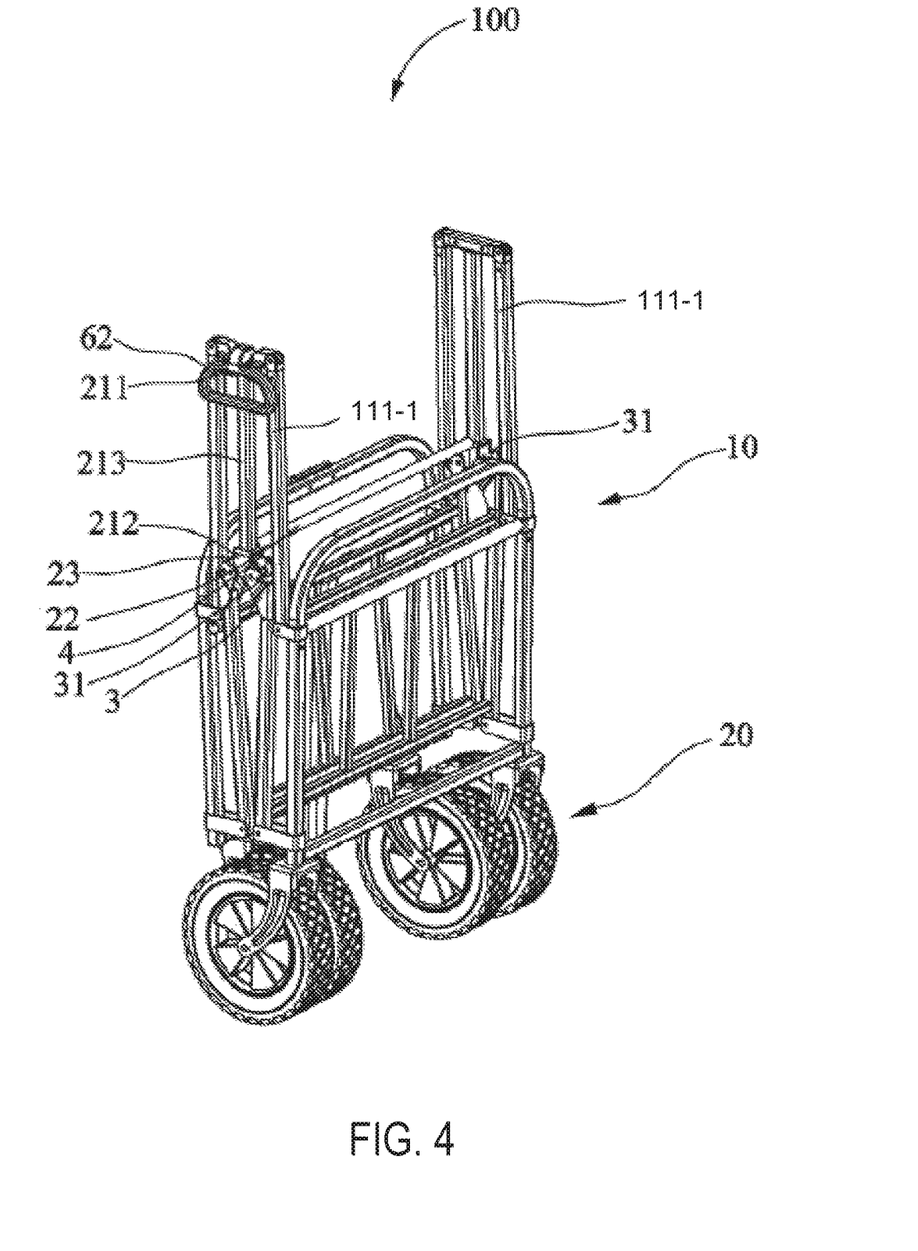
FIG. 4 is a schematic view illustrating the exemplary foldable cart of FIG. 1 in a folded state.

For instance, FIGS. 1 and 5 illustrate the handle positioned at a first position, and FIGS. 2 and 6 illustrate the handle positioned at a second position. As shown, at the first position, the handle pushes down middle positioning rod 6 along with lower block 23 and positioning pins 4, and thus positions the first and second positioning pins into the first slot of the first pivoting piece and the second slot of the second pivoting piece. As a result, the first pivoting piece and the second pivoting piece are restricted from rotating with respect to the lower connecting piece of the first connector, and consequently, the cart is stabilized and will not fold unintentionally. At the second position, the handle lifts up middle positioning rod 6 along with lower block 23 and positioning pins 4, and thus removes the first and second positioning pins from the first slot of the first pivoting piece and the second slot of the second pivoting piece. As a result, the first pivoting piece and the second pivoting piece are allowed to rotate with respect to the lower connecting piece of the first connector, and consequently, the cart is allowed to fold or unfold when desired.

While FIGS. 1-4 illustrate by way of example the first connector placed on a left side of the cart, it should be noted that the first connector of the present invention can be placed on either sides (e.g., left or right side) of the cart. It should also be noted that the second connector can be the same as or different from the first connector. For instance, in some exemplary embodiments, the second connector additionally or optionally includes some or all of the features of the first connector disclosed herein, including but not limited to positioning pin 4, slot 31, lower block 23, elastic member 5, positioning rod 6, and/or handle 62. Description of such a second connector is omitted to avoid redundancy.

In some exemplary embodiments, the connecting and stabilizing mechanism further includes a lateral bar such as lateral bar 22 disposed between the first and second connectors. Lateral bar 22 has a first end portion connected to the first connector and a second end portion connected to the second connector. In an exemplary embodiment, the first end portion of the lateral bar is connected to the lower connecting piece or the middle connecting bar of the first connector, and the second end portion of the lateral bar is connected to the lower connecting piece or the middle connecting bar of the second connector.

As disclosed herein, the connecting and stabilizing mechanism of the present invention pivotally connects the first and second frames, and thus facilitates the folding and unfolding of the cart. The connecting and stabilizing mechanism includes positioning pins and corresponding slots to restrict rotation of the first and second frames, and thus prevent unintentional folding of the cart. Moreover, in some exemplary embodiments, the connecting and stabilizing mechanism includes an elastic member that pushes the positioning pins into the slots when the cart is unfolded, and helps to retain the positioning pins in the slots while the cart is in use. Further, in some exemplary embodiments, the connecting and stabilizing mechanism includes a positioning rod and a handle pivotally connected to the positioning rod at an off-center position. The positioning rod and the handle can selectively push the positioning pins into the slots or remove the positioning pins from the slots, and thus selectively stabilize the cart when it is unfolded or allow the cart to fold or unfold when desired.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "up" or "down", "left" or "right", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first connector could be termed a second connector, and, similarly, a second connector could be termed a first connector, without changing the meaning of the description, so long as all occurrences of the "first connector" are renamed consistently and all occurrences of the "second connector" are renamed consistently.

What is claimed is:

1. A connecting and stabilizing mechanism of a foldable cart, wherein the foldable cart comprises a first frame and a second frame, each of the first and second frames comprises a first upper longitudinal bar and a first lower longitudinal bar on a first side, and a second upper longitudinal bar and a second lower longitudinal bar on a second side, the connecting and stabilizing mechanism comprising:
    a first connector to be disposed between the first and second frames at the first side to pivotally connect the first upper and lower longitudinal bars of the first frame with the first upper and lower longitudinal bars of the second frame; and
    a second connector to be disposed between the first and second frames at the second side to pivotally connect the second upper and lower longitudinal bars of the first frame with the second upper and lower longitudinal bars of the second frame;
    wherein each of the first and second connectors comprises:
        an upper connecting piece having a first end portion to be pivotally connected to the first or second upper longitudinal bar of the first frame and a second end portion to be pivotally connected to the first or second upper longitudinal bar of the second frame;
        a lower connecting piece having a first end portion and a second end portion;
        a middle connecting bar disposed between the upper connecting piece and the lower connecting piece, and having an upper end portion fixedly coupled to the upper connecting piece and a lower end portion fixedly coupled to the lower connecting piece;
        a first pivoting piece pivotally connected to the first end portion of the lower connecting piece, and to be fixedly connected to the first or second lower longitudinal bar of the first frame; and
        a second pivoting piece pivotally connected to the second end portion of the lower connecting piece, and to be fixedly connected to the first or second lower longitudinal bar of the second frame;
    wherein at least one connector in the first and second connectors further comprises:
        a first positioning pin disposed at or adjacent to the first end portion of the lower connecting piece of the at least one connector;
        a second positioning pin disposed at or adjacent to the second end portion of the lower connecting piece of the at least one connector;
    wherein the first pivoting piece of the at least one connector is formed with a first slot corresponding to the first positioning pin, wherein when the first positioning pin is received in the first slot, the first positioning pin restricts the first pivoting piece of the at least one connector from rotating with respect to the lower connecting piece of the at least one connector; and
    wherein the second pivoting piece of the at least one connector is formed with a second slot corresponding to the second positioning pin, wherein when the second positioning pin is received in the second slot, the second positioning pin restricts the second pivoting piece of the at least one connector from rotating with respect to the lower connecting piece of the at least one connector.

2. The connecting and stabilizing mechanism of claim 1, further comprising a lateral bar disposed between the first and second connectors, and having a first end portion connected to the first connector and a second end portion connected to the second connector.

3. The connecting and stabilizing mechanism of claim 2, wherein the first end portion of the lateral bar is connected to the lower connecting piece or the middle connecting bar of the first connector, and the second end portion of the lateral bar is connected to the lower connecting piece or the middle connecting bar of the second connector.

4. The connecting and stabilizing mechanism of claim 1, wherein for each of the first and second connectors, the upper connecting piece is longer than the lower connecting piece.

5. The connecting and stabilizing mechanism of claim 1, wherein one or more of the first and second slots are of a "C" shape.

6. The connecting and stabilizing mechanism of claim 1, wherein the at least one connector further comprises:
a lower block disposed in the lower connecting piece of the at least one connector, wherein:
the lower block has a first side portion exposed outside of the first end portion of the lower connecting piece of the at least one connector, and a second side portion exposed outside of the second end portion of the lower connecting piece of the at least one connector;
the first positioning pin is fixedly coupled to or integrally formed at the first side portion of the lower block; and
the second positioning pin is fixed coupled to or integrally formed at the second side portion of the lower block.

7. The connecting and stabilizing mechanism of claim 6, wherein the lower block is formed with a receiving space, wherein the at least one connector further comprises:
an elastic member disposed in the receiving space of the lower block, and having a lower end abutting the lower block and an upper end abutting an interior wall of the lower connecting piece of the at least one connector, thereby pushing the first positioning pin into the first slot of the first pivoting piece of the at least one connector and the second positioning pin into the second slot of the second pivoting piece of the at least one connector.

8. The connecting and stabilizing mechanism of claim 7, wherein the elastic member is a spring.

9. The connecting and stabilizing mechanism of claim 7, wherein the at least one connector further comprises:
a middle positioning rod, a lower end portion thereof passing through a hole formed at the lower connecting piece and coupled to the lower block, and an upper end portion thereof passing through a hole formed at the upper connecting piece; and
a handle comprising a connecting portion pivotally connected to the upper end portion of the middle positioning rod at an off-center position of the connecting portion of the handle;
wherein when the handle is being positioned at a first position, the handle assists in positioning the first and second positioning pins in the first slot of the first pivoting piece and the second slot of the second pivoting piece, thereby restricting the first pivoting piece and the second pivoting piece from rotating with respect to the lower connecting piece of the at least one connector;
wherein when the handle is being positioned at a second position, the handle assists in removing the first and second positioning pins from the first slot of the first pivoting piece and the second slot of the second pivoting piece, thereby allowing the first pivoting piece and the second pivoting piece to rotate with respect to the lower connecting piece of the at least one connector.

10. The connecting and stabilizing mechanism of claim 9, wherein the middle positioning rod of the at least one connector is formed with a stopper at the lower end portion, and the lower block is sleeved on the lower end portion and abuts the stopper of the middle positioning rod of the at least one connector.

11. The connecting and stabilizing mechanism of claim 9, wherein the middle connecting bar of the at least one connector is hollow to accommodate the middle positioning bar of the at least one connector.

12. A foldable cart comprising:
a cart frame comprising a first frame, a second frame, and a connecting and stabilizing mechanism disposed between the first and second frames and pivotally connecting the first and second frames; and
a plurality of wheels rotatably coupled to the cart frame;
wherein each of the first and second frames comprises a first upper longitudinal bar and a first lower longitudinal bar on a first side, and a second upper longitudinal bar and a second lower longitudinal bar on a second side;
wherein the connecting and stabilizing mechanism comprises a first connector and a second connector disposed between the first and second frames at the first and second sides, respectively;
wherein each of the first and second connectors comprises:
an upper connecting piece having a first end portion pivotally connected to the first or second upper longitudinal bar of the first frame and a second end portion pivotally connected to the first or second upper longitudinal bar of the second frame;
a lower connecting piece having a first end portion and a second end portion;
a middle connecting bar disposed between the upper connecting piece and the lower connecting piece, and having an upper end portion fixedly coupled to the upper connecting piece and a lower end portion fixedly coupled to the lower connecting piece;
a first pivoting piece pivotally connected to the first end portion of the lower connecting piece, and fixedly connected to the first or second lower longitudinal bar of the first frame; and
a second pivoting piece pivotally connected to the second end portion of the lower connecting piece, and fixedly connected to the first or second lower longitudinal bar of the second frame;
wherein at least one connector in the first and second connectors further comprises:
a first positioning pin disposed at or adjacent to the first end portion of the lower connecting piece of the at least one connector;
a second positioning pin disposed at or adjacent to the second end portion of the lower connecting piece of the at least one connector;
wherein the first pivoting piece of the at least one connector is formed with a first slot corresponding to the first positioning pin, wherein when the first positioning pin is received in the first slot, the first positioning pin restricts the first pivoting piece of the at least one connector from rotating with respect to the lower connecting piece of the at least one connector; and wherein the second pivoting piece of the at least one connector is formed with a second slot corresponding to the second positioning pin, wherein when the second positioning pin is received in the second slot, the second positioning pin restricts the second pivoting piece of the at least one connector from rotating with respect to the lower connecting piece of the at least one connector.

13. The foldable cart of claim 12, wherein the connecting and stabilizing mechanism further comprises a lateral bar disposed between the first and second connectors, and having a first end portion connected to the first connector and a second end portion connected to the second connector.

14. The foldable cart of claim 13, wherein the first end portion of the lateral bar is connected to the lower connecting piece or the middle connecting bar of the first connector, and the second end portion of the lateral bar is connected to the lower connecting piece or the middle connecting bar of the second connector.

15. The foldable cart of claim 12, wherein for each of the first and second connectors, the upper connecting piece is longer than the lower connecting piece.

16. The foldable cart of claim 12, wherein one or more of the first and second slots are of a "C" shape.

17. The foldable cart of claim 12, wherein the at least one connector further comprises:
a lower block disposed in the lower connecting piece of the at least one connector, wherein:
the lower block has a first side portion exposed outside of the first end portion of the lower connecting piece of the at least one connector, and a second side portion exposed outside of the second end portion of the lower connecting piece of the at least one connector;
the first positioning pin is fixedly coupled to or integrally formed at the first side portion of the lower block; and
the second positioning pin is fixedly coupled to or integrally formed at the second side portion of the lower block.

18. The foldable cart of claim 17, wherein the lower block is formed with a receiving space, wherein the at least one connector further comprises:
an elastic member disposed in the receiving space of the lower block, and having a lower end abutting the lower block and an upper end abutting an interior wall of the lower connecting piece of the at least one connector, thereby pushing the first positioning pin into the first slot of the first pivoting piece of the at least one connector and the second positioning pin into the second slot of the second pivoting piece of the at least one connector.

19. The foldable cart of claim 18, wherein the elastic member is a spring.

20. The foldable cart of claim 18, wherein the at least one connector further comprises:
a middle positioning rod, a lower end portion thereof passing through a hole formed at the lower connecting piece and coupled to the lower block, and an upper end portion thereof passing through a hole formed at the upper connecting piece; and
a handle comprising a connecting portion pivotally connected to the upper end portion of the middle positioning rod at an off-center position of the connecting portion of the handle;
wherein when the handle is being positioned at a first position, the handle assists in positioning the first and second positioning pins in the first slot of the first pivoting piece and the second slot of the second pivoting piece, thereby restricting the first pivoting piece and the second pivoting piece from rotating with respect to the lower connecting piece of the at least one connector;
wherein when the handle is being positioned at a second position, the handle assists in removing the first and second positioning pins from the first slot of the first pivoting piece and the second slot of the second pivoting piece, thereby allowing the first pivoting piece and the second pivoting piece to rotate with respect to the lower connecting piece of the at least one connector.

21. The foldable cart of claim 20, wherein the middle positioning rod of the at least one connector is formed with a stopper at the lower end portion, and the lower block is sleeved on the lower end portion and abuts the stopper of the middle positioning rod of the at least one connector.

22. The foldable cart of claim 20, wherein the middle connecting bar of the at least one connector is hollow to accommodate the middle positioning bar of the at least one connector.

* * * * *